(12) United States Patent
Chidambaran et al.

(10) Patent No.: US 6,253,226 B1
(45) Date of Patent: Jun. 26, 2001

(54) DURATION-BASED MEMORY MANAGEMENT OF COMPLEX OBJECTS

(75) Inventors: Lakshminarayanan Chidambaran; Srinath Krishnaswamy, both of Fremont; Joyo Wijaya, Menlo Park, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/103,547

(22) Filed: Jun. 24, 1998

(51) Int. Cl.[7] .................................................. G06F 9/00
(52) U.S. Cl. ........................ 709/104; 711/5; 711/102; 711/103; 711/1; 707/101; 707/103
(58) Field of Search ........................... 709/100, 101, 709/102, 103, 104; 707/338, 339, 348, 101, 102; 711/1, 5, 11, 102, 103, 203

(56) References Cited

U.S. PATENT DOCUMENTS

| | | | |
|---|---|---|---|
| 5,649,139 | * | 7/1997 | Weinreb et al. ..................... 711/202 |
| 5,742,793 | * | 4/1998 | Sturges et al. ....................... 711/152 |
| 5,822,590 | * | 10/1998 | Gupta ...................................... 717/5 |
| 5,838,977 | * | 11/1998 | Gupta ...................................... 717/5 |
| 6,047,280 | * | 4/2000 | Ashby et al. ........................... 707/2 |

* cited by examiner

Primary Examiner—Majid A. Banankhah
(74) Attorney, Agent, or Firm—Ditthavong & Carlson, P.C.

(57) ABSTRACT

Memory for complex objects is maintained in pools of dynamic memory on a "per-duration" basis. Each duration is assigned its own area or areas of the heap, and all the memory allocation for a specific duration comes from those assigned areas of the heap. Memory allocation for a complex object is performed with respect to a single duration and, hence, memory is allotted for the complex object from the corresponding memory pool. When a duration is terminated, the memory allocated for its corresponding heap is freed, thereby releasing memory for all the complex object using the memory from the memory pool for that duration. Management of other resources for complex objects such as opening and closing files may also be duration-based. In one aspect, the memory management of complex objects is located in an automatically generated client stub routine for a remote procedure call. Accordingly, the interface description language (IDL) for the remote procedure call is extended to incorporate the duration idea for out parameters.

36 Claims, 7 Drawing Sheets

DURATION-BASED MEMORY MANAGEMENT OF COMPLEX OBJECTS

RELATED APPLICATIONS

This application is related to the commonly assigned, U.S. patent application Ser. No. 09/103,548, entitled "Memory Management of Complex Objects Returned from Procedure Calls," filed on Jun. 24, 1998 by Lakshminarayanan Chidambaran, the contents of which are hereby incorporated by reference herein.

FIELD OF THE INVENTION

The present invention relates to computer systems and more particularly to memory management techniques for complex objects within a database system.

BACKGROUND OF THE INVENTION

A complex object is an instance of a data type or object-oriented class that contains zero or more scalar attributes (e.g. integers, characters, etc.) and one or more attributes that can point to or reference other complex objects. An attribute capable of pointing to or referencing another object is referred to herein as a "pointer." Thus, a complex object may be mapped to a top-level data structure with one or more pointers to other data structures that in turn may have pointers to other data structures. Examples of complex objects include linked lists, trees, and graphs.

Memory to store complex objects is typically dynamically allocated from an area of memory available to a program called a "heap." More specifically, each data structure in the complex object, including the complex objects to which the complex object has pointers, is individually allocated from the heap and referenced by a pointer. Thus, a top-level data structure of a complex object includes pointers to secondarily allocated data structures. The dynamic memory allocation for a complex may be performed by a vendor-supplied operating system or run-time library call, such as malloc(3) on Unix operating system platforms, or by a user-supplied memory allocation routine that ultimately makes an independent call to a vendor-supplied memory allocation routine. This type of memory allocation typically results in the dispersion of a complex object over many non-contiguous areas of the heap, due to piecemeal allocation of the complex object and heap fragmentation after many allocations and deallocations.

For example, in FIG. 6, complex object p is created in step 600 by making n calls to a dynamic memory allocation routine called "alloc." Complex object p uses five non-contiguous areas of memory in heap 610, labeled $p_1, p_2, p_3, p_4,$ and $p_5$, respectively. In addition, another complex object q is created in step 602, consuming four non-contiguous areas of memory in the heap, labeled $q_1, q_2, q_3,$ and $q_4$. Heap 612 illustrates the heap 610 after memory has been allocated for complex object q.

When a complex object is no longer needed by the program, the individually allocated data structures of the complex object are deallocated or "freed" to allow the memory currently being used to store the complex object to be recycled (i.e. to be made available for other purposes). Thus, freeing a complex object involves freeing each allocated data structure belonging to the complex object. Deallocation of a complex object typically involves traversing the structure of the complex object by following pointers stored in the various data structures that make up the complex object. These pointers are followed to locate and deallocate the various non-contiguous areas of the heap used to store the data structures belonging to the complex parameter.

Since traversing a complex data structure is type-dependent, a deallocation routine is written for each complex object type. Referring again to FIG. 6, the complex object p is deallocated in step 604 by calling a type-specific deallocation routine called "P_free( )" with the complex object p passed in as a parameter. In response, the complex object p is traversed and each of the dynamically allocated memory areas that belong to p is freed by a separate call to free($p_n$). Heap 614 illustrates the state of heap 612 after memory for p is no longer allocated. Likewise, complex object q is deallocated by calling a different "Q_free( )" routine in step 606. The "Q_free( )" routine traverses the data structures of complex object q and frees the individually allocated memory areas of the complex object with individual calls to free($q_n$). Heap 616 illustrates heap 614 after complex object q has been deallocated. Therefore, this "per-object" deallocation approach can be computationally expensive, and the computational cost for performing deallocation for a complex object increases with the complexity of the object.

A "per-client" memory management approach that may reduce the computational expense in deallocating complex objects is available in the Distributed Computing Environment (DCE) defined by the Open Software Foundation (OSF). According to this approach, an application programmer codes the following function call before a call to one or more client stub routines that return complex objects:

rpc_ss_set_client_alloc_free(rpc_ss_allocate, rpc_ss_free);

When called, this routine instantiates a new dynamic memory management system for the process and registers new memory allocation and deallocation routines. When the called client stub routines return complex objects, the client stub routines invoke the registered memory allocation routine, rpc_ss_allocate, to dynamically allocate memory for the complex objects within the new memory management system. When all of the complex objects are no longer needed outside the client stub routines that created them, the entire new memory management system may be torn down, releasing all the memory allocated for the complex objects. This process may be coded by an application program with a rpc_ss_disable_allocate( ) function call.

Referring the FIG. 7, an application programmer instantiates a new memory management system with a call to the enable routine in step 700, which registers an appropriate memory allocation routine for the new memory management system and sets up an area 720 in heap 710 for allocating memory. In step 702, when complex object p is instantiated, memory for complex object p is allocated by the registered memory allocation routine from memory area 720 as shown in heap 712. When complex object q is created in step 704, memory for complex object q is also allocated from memory area 720 as shown in heap 714. Finally, after both complex object p and complex object q are no longer needed, the application programmer disables the new memory management system in step 706 by coding an appropriate disable call, thereby releasing the memory for all the allocated memory, including complex objects p and q. Heap 716 depicts heap 714 after the disable call routine is executed.

Although the process of tearing down the memory management system to release the memory for all the allocated complex objects can be less computationally expensive than the "per-object" deallocation approach, the "per-client"

approach is less flexible because different complex objects typically have different and overlapping lifetimes. The lifetime of a complex object is the period from the creation of the complex object until the last use of the complex object. For example, referring back to FIG. 7, the lifetime 732 of complex object q commences at step 704 and ends when it is no longer needs at step 706, where it can be safely deallocated. In this example, the lifetime 730 of complex object p commences at step 702, extends beyond the creation of complex object q in step 704, and ends some time before the end of the lifetime 732 of complex object q. Consequently, the lifetime 730 of complex object p overlaps the lifetime 732 of complex object q because complex object q was created after complex object p was created but before complex object p was terminated.

In this situation, the "per-client" memory management system cannot be taken down at the end of the lifetime 730 of complex object p because deallocation of memory area 720 will prematurely release the allocated memory for complex object q. In contrast, the "per-object" deallocation allows the complex object to be freed at the end of its lifetime. Referring again to FIG. 6, complex object p is freed in step 604 at the end of its lifetime 620, and complex object q is freed in step 606 at the end of its lifetime 622.

One conventional attempt to handle overlapping lifetimes is convert a complex object from a "per-client" memory management approach to a "per-object" memory management approach. Accordingly, the complex object is cloned from the "per-client" memory management area into a more persistent area of the heap by performing a deep copy operation on the complex object. A deep copy, however, is a computationally expensive operation because the complex object data structure needs to be traversed to visit every node in the complex object for copying. Furthermore, freeing the cloned complex object requires the expensive traversal of the complex object as in the "per-object" approach. Consequently, the conscientious application programmer is faced with a dilemma: either to defer the deallocation of the memory for complex object p, thereby wasting memory resources, or to deallocate complex object p according to the "per-object" approach and incur the computational overhead of traversing the data structures and pointers of complex object p.

Another problem with the "per-client" approach is that it is error-prone. There are several operations an application programmer must code for every procedure call that returns complex objects, and it is easy to overlook or miscode one of the operations, resulting in a bug that causes the program to malfunction. For example, the application programmer may instantiate a new memory management system without realizing that another memory management system is in effect, thereby causing the previously allocated memory to be lost. Memory allocation errors are usually very subtle and are some of the most difficult bugs to diagnose and fix.

Therefore, there is a need for a memory management system and methodology that avoids the computational costs in traversing complex objects present in the conventional "per-object" deallocation approach while avoiding the loss of flexibility incurred by using the "per-client" deallocation approach. There is also a need for reducing bugs in implementing a memory management system.

SUMMARY OF THE INVENTION

These and other needs are addressed by the present invention by providing a duration-based memory management system and methodology. Pools of dynamic memory are allocated for complex objects on a "per-duration" basis. By allotting memory for a complex object from an allocated memory pool, the memory used by the complex object is easily released by deallocating the memory pool, thereby avoiding the computational expense in traversing complex data structures. This "per-duration" approach is more flexible than the "per-client" approach, because the separate memory pools for complex objects are separately deallocated.

Accordingly, one aspect of the invention relates to a computer-implemented method and a computer-readable medium bearing instructions for managing memory for dynamically allocated complex objects. The complex objects are assigned to durations. Pools of dynamic memory are allocated, in which each pool corresponds to a duration. Memory for a complex object is allotted from a pool that corresponds to the duration assigned to the complex object. Memory for the complex objects is released by deallocating the pools within which the complex objects were allocated. The lifetime of one of the complex objects assigned to one of the durations overlaps the lifetime of another complex object assigned another duration. Allocation of pools of dynamic memory corresponding to durations enables both efficient and flexible memory deallocation of complex objects.

Another aspect of the invention relates to automatically coding the memory management functionality in the context of a procedure call, thereby reducing the opportunity for human error in coding the memory management instructions. Specifically, a computer-implemented method and computer-readable medium bearing instructions for translating a description of an interface for a procedure call are provided. The description of the interface for a procedure call is parsed to determine if a duration is specified for a complex object-parameter. A routine for the procedure call is automatically generated based on the interface description. The routine includes instructions for allotting memory for the complex object out-parameter within a pool of allocated dynamic memory associated with the duration assigned to the complex object out-parameter. A memory deallocation routine including instructions for deallocating the pool is provided. In one embodiment, a client stub routine that supports duration-based memory management is automatically generated from a description of an interface for a remote procedure call.

Yet another aspect of the invention is applicable to managing resources, such as files, network connections, pin lifetimes in an object cache, as well as memory, for complex objects. Accordingly each of said complex objects is assigned to any of a number of durations, and resources are allocated to the complex objects based on their assigned duration. The resources for the complex objects are released by terminating the durations assigned to them. In one embodiment, durations can be nested, wherein a duration can be created as the child duration of a parent duration. In this embodiment, the resources for a complex object assigned to a child duration can be released by terminating the parent duration, which automatically terminates the child duration.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENTS

A method and apparatus are described for memory management of complex objects. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
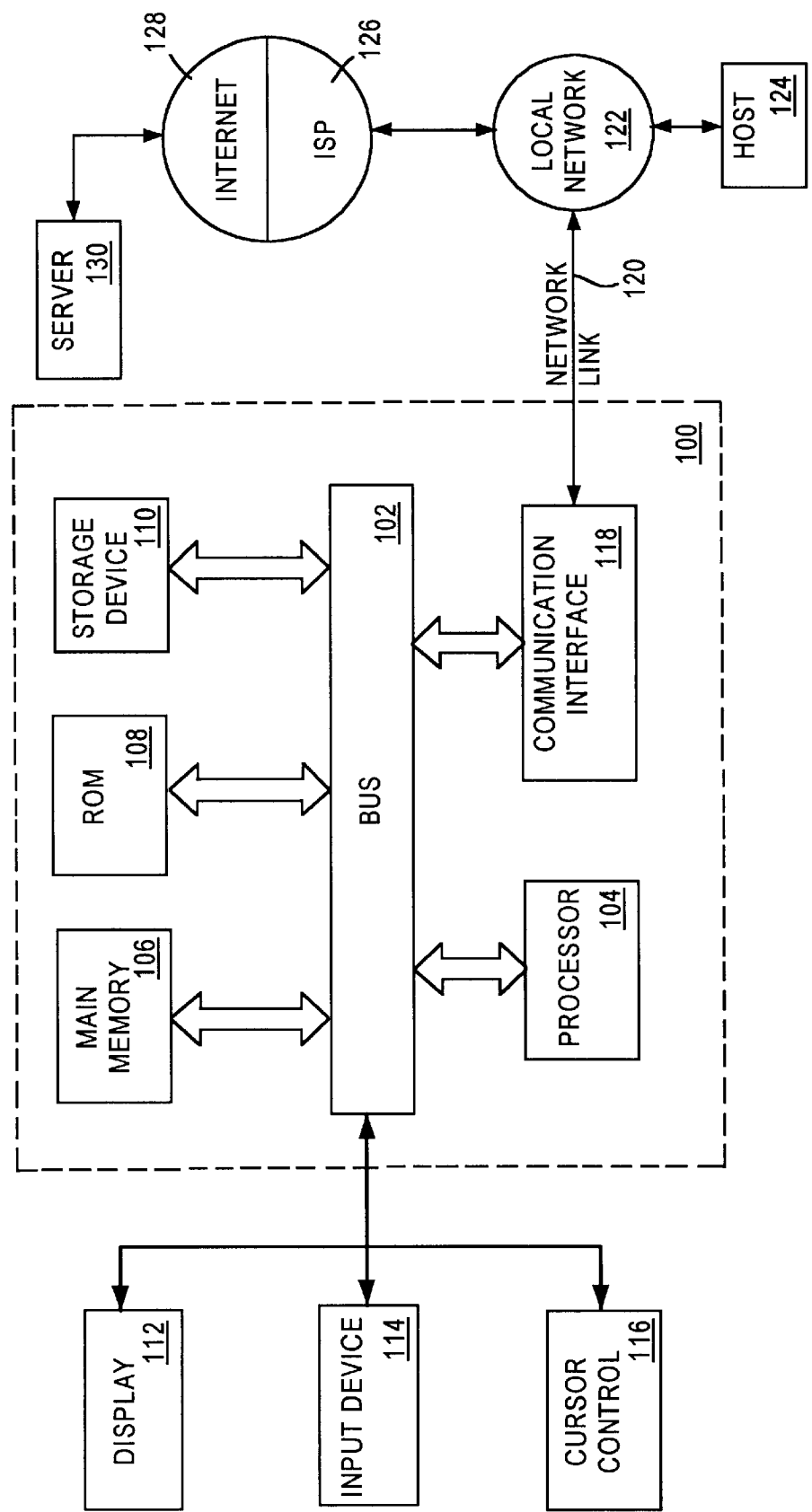
FIG. 1 is a high-level diagram that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management of complex objects. According to one embodiment of the invention, memory management of complex objects is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management of complex objects as described herein.

The received code may be executed by processor 104 as it is received, and/or stored in storage device 110, or other non-volatile storage for later execution. In this manner, computer system 100 may obtain application code in the form of a carrier wave.

Duration-Based Memory Pools

In accordance with one aspect of the invention, memory for complex objects is maintained in pools of dynamic memory on a "per-duration" basis. That is, a memory allocation routine is provided that takes not only a size parameter (as in conventional memory allocation routines) but also a "duration" parameter. Each distinct duration is assigned its own area or areas of the heap, and all the memory allocation for a specific duration comes from those assigned areas of the heap. Memory allocation for a complex object is performed with respect to a single duration and, hence, memory is allotted for the complex object from the corresponding memory pool. When a duration is terminated, the memory allocated for its corresponding heap is freed, thereby releasing memory for all the complex objects that are using the memory from the memory pool for that duration.

Figure 2:
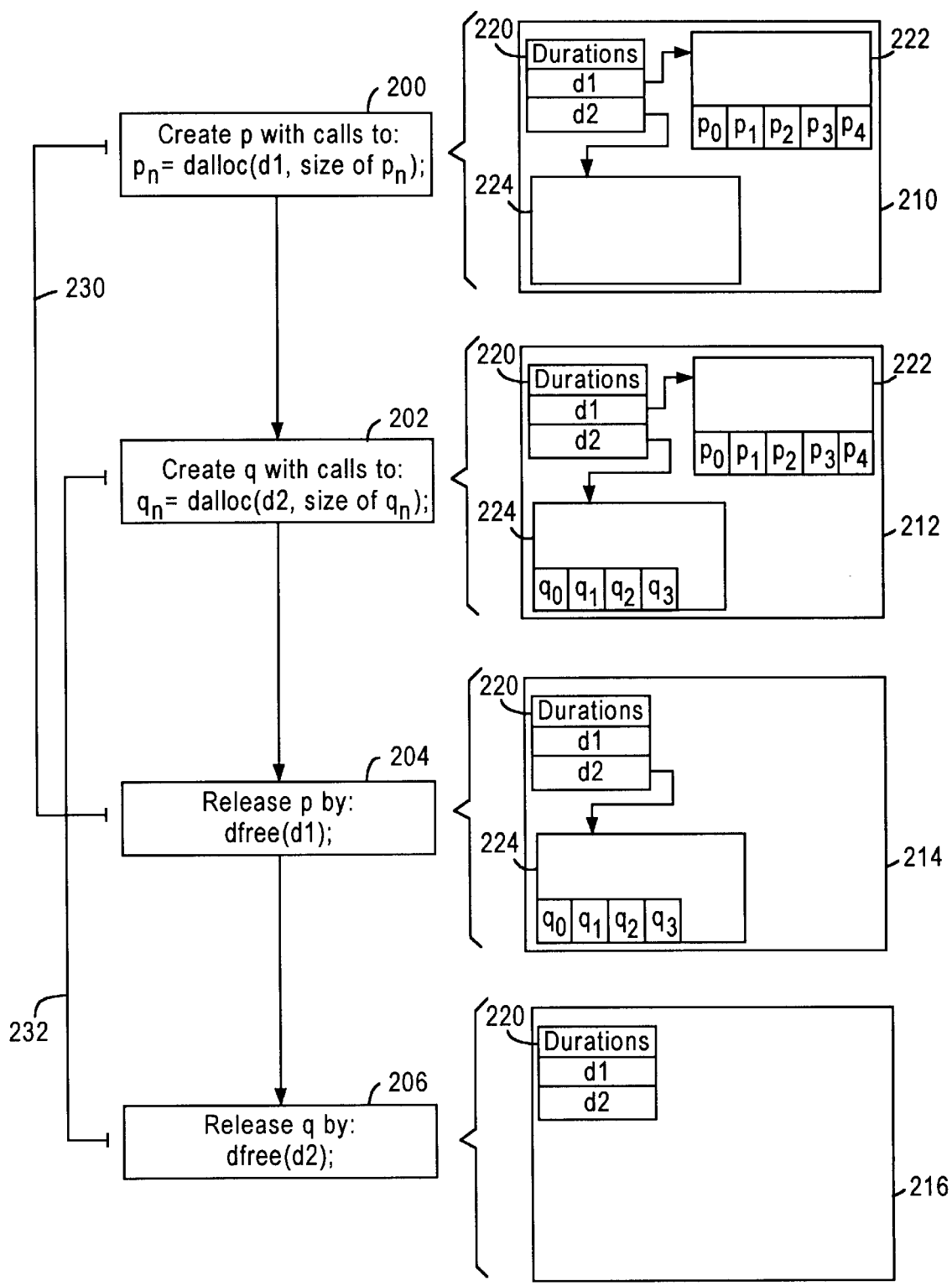
FIG. 2 depicts a sequence of memory allocations and deallocation and a corresponding heap in accordance with one embodiment.

FIG. 2 depicts an exemplary heap 210 containing a first memory pool 222, which is assigned to duration "d1," and a second memory pool 224, assigned to duration "d2." While the present invention is not limited to any particular implementation of memory pools 222 and 224, one approach for implementing memory pools 222 and 224 is described in detail hereinafter. A duration may be identified by any of a variety ways, including a unique integer value, an enumerated type value, a pointer value, and any other such unique value, referred to herein as a "duration identifier." In one embodiment, the relationship between a duration identifier and the corresponding memory pool for the duration is maintained by a duration table 220. Duration table 220 maps duration identifiers to the corresponding memory pool. Referring to FIG. 2, duration table 220 maps duration d1 to memory pool 222 and duration d2 to memory pool 224. In one implementation, the duration identifier is an index into a lookup table 220. For example, if duration d1 assigned to memory pool 222 is maintained in the first entry of table 220, then the duration identifier for duration d1 is 1. In another implementation, each entry in the duration table 220 includes a field for the duration identifier and a field for the corresponding memory pool.

When memory for a complex object is needed, for example when the complex object is created and initialized, the memory for the complex object is allotted from one of the memory pools that is assigned to a specific duration. Referring again to FIG. 2, complex object p is created in step 200 using many calls to a memory allocation routine that takes an additional argument for a duration identifier. In this example, complex object p uses memory for duration d1, that is memory from the memory pool 222 in heap 210. The calls to the duration-based memory allocation routine results in memory from pool 222 being allotted to store the various data structures that complex object p comprises. FIG. 2 depicts, as an example, five memory areas labeled $p_1$, $p_2$, $p_3$, $p_4$, and $p_5$, respectively, allotted for complex object p from memory pool 224 in heap 210. While the present invention is not limited to any particular method of allotting memory from a memory pool, one method of allotment is described in more detail hereinafter.

At step 202, memory for complex object q is allotted for another duration d2 and thus from another memory pool 226. Heap 212 depicts heap 210 after four areas of memory labeled $q_1$, $q_2$, $q_3$, and $q_4$ have been allocated for complex object q within pool 224. The lifetime 230 of complex object p and the lifetime 232 of complex object q overlap, because the memory pool 224 for complex object q was allocated after the memory pool 222 for complex object p but before memory pool 222 is deallocated. Since, at this point, memory for complex object p and memory for complex object q were allotted from different pools 222 and 224, memory for one of those complex objects can be released by deallocating the corresponding pool 222 or 224 without prematurely releasing the memory for the other complex object.

At the end of the lifetime 230 of complex object p, it is desirable to release the memory for complex object p to reduce memory usage. Accordingly, step 204 is a call to a routine to deallocate a pool of memory that is associated with the duration for complex object p. In this example, the memory pool 222 for duration d1 is deallocated, releasing all the memory allotted therein, i.e. memory for complex object p as shown in heap 214. Thus, memory allocated for complex object p is now available for other purposes, fostering a reduction in unnecessary memory usage. Since memory for complex object q was not allotted from pool 222, the deallocation of pool 222 in step 204 does not adversely and prematurely release memory for complex object q. Accordingly, complex object q can be used until the end of its lifetime 232. At the end of the lifetime 232 of complex object q, a duration-based deallocation routine is called referencing duration d2 that indicates pool 224 (step 206). Accordingly, pool 224 is deallocated, releasing memory consumed by complex object q and resulting in heap 216.

Therefore, employment of duration-based memory pools for complex objects allows memory to be managed more flexibly than the "per-client" memory management approach. Unlike the conventional approach of cloning a complex object to achieve greater control over the deallocation of the object, the complex object remains in the memory pool. Thus, the complex object is efficiently deallocated when the memory pool is deallocated without incur the overhead in traversing the complex object in closing the complex object or freeing the complex object as in the "per-object" approach.

Although a "per-duration" memory allocation has been illustrated with a single complex object per duration, it is to be understood that a plurality of complex objects may be allocated for a particular duration, because, for example, the lifetimes for the complex objects end at the same point. Thus, all the memory for these complex objects is allotted from the same pool associated with the duration, and thus all the complex objects can be deallocated together.

Allotting Memory from a Duration-Based Memory Pool

The present invention is not limited to any particular implementation of memory pools, although it is generally preferable to implement the memory pools with a data structure that is easy to traverse, such as a linked list of memory chunks. These memory chunks are obtained from the heap on an as needed basis. On many computer systems, an operating system or run-time library call to allocate additional dynamic memory is fairly expensive. Thus, allocating chunks of a minimum size such as 10 kb or 32 kb amortizes the cost of the dynamic allocation over many allotments of memory for the data structure.

In some applications, instantiating a complex object involves many requests for memory allocations of a particular size. For example, a B-tree typically includes many branch nodes, each of which uses the same amount of memory. To exploit this clustering of memory allocations for a particular size, some implementations subdivide each memory pool for handling memory requests for different size. Accordingly, one embodiment implements a memory pool with a table of linked lists of memory chunks, in which each entry in the table corresponds to a predefined range of memory allocations. For example, one entry includes a linked list for memory requests under 8 bytes, another entry for memory requests between 9 and 16 bytes, a third entry for memory requests from 17 to 32 bytes, etc.

Figure 3:
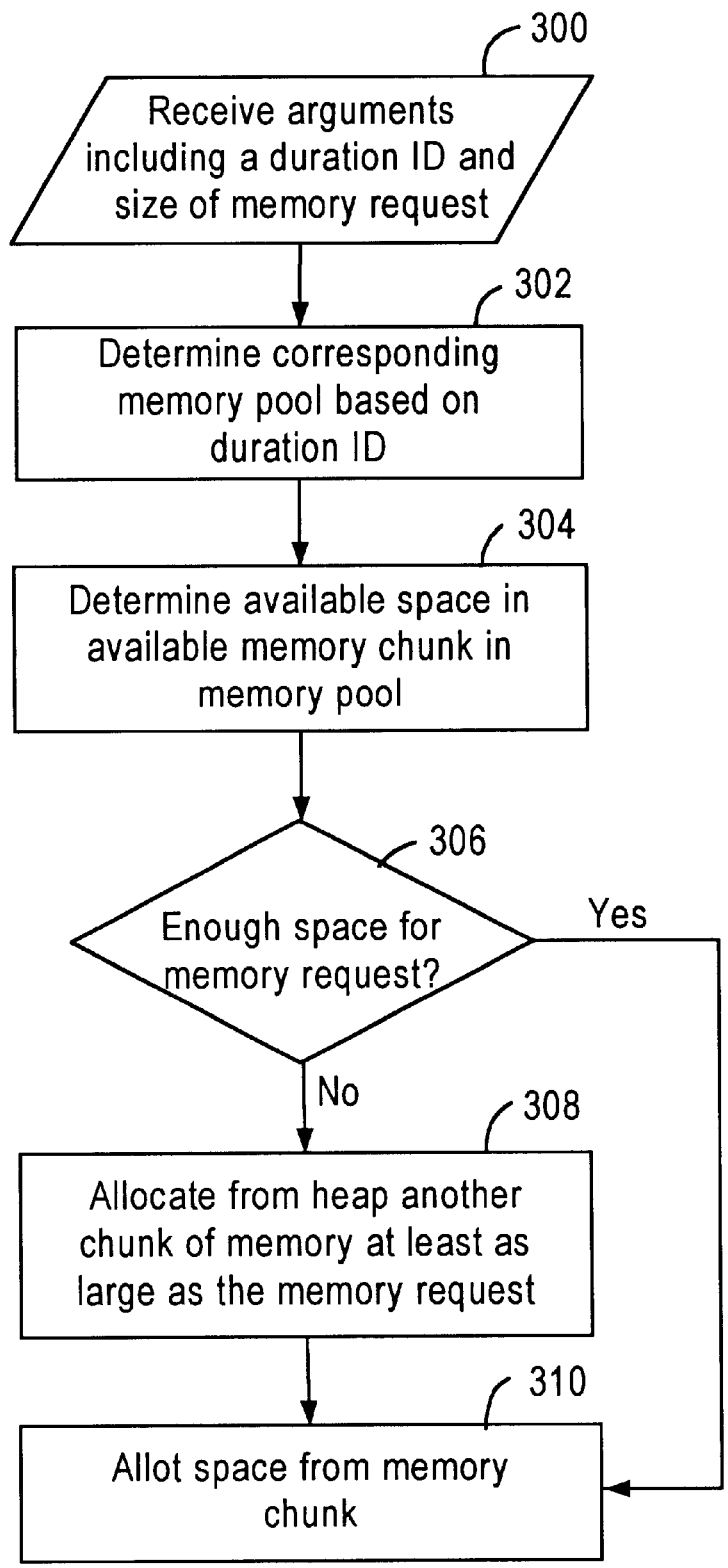
FIG. 3 is a flowchart showing an operation of allotting memory from an allocated memory pool according to one embodiment.

FIG. 3 is a flowchart showing one way to allot memory for a complex object from a memory pool, maintained in part as a linked list of memory chunks. At least one of the memory chunks is only partially allotted, and the memory pool maintains a value that indicates the start of available space in the memory. The start of available space in the memory chunk value can be a pointer within the memory chunk and an offset from the beginning of the memory chunk.

A memory allotment routine, labeled "dalloc( )" in steps 200 and 202, receives at least two arguments: a duration identifier and a size request (step 300). In step 302, the duration identifier is used to determine which memory pool is to be used, for example by accessing duration lookup table 220. After the appropriate memory pool is identified, the available space in a partially filled memory chunk is calculated (step 304). There are various techniques for making this calculation. For example, if the size of the entire memory chunk is known, then the available space can be determined by subtracting the size from the starting offset. If there is not enough space for the memory request (tested in step 306), then another chunk of memory at least as large as the memory request is allocated from the heap (step 308) and space is allotted from the memory chunk (step 310). On the other hand, if there is enough space for the memory request (tested in step 306), then execution skips to step 310 where the space is allotted from the memory chunk for the request.

Therefore, in accordance with one aspect of the invention, the memory pools are maintained as one or more linked lists of memory chunks. Since linearly traversing a linked list is a straightforward procedure, memory can be released without incurring a high computational cost associated with traversing very complex objects. For example, the number of pointer dereferences will typically be much greater when individually freeing complex objects than when freeing the linked list of memory chunks.

Pre-Defined and User-Defined Durations

One aspect of the present invention stems from the realization that, in a database system, the lifetimes of many complex objects terminate the same point in time that corresponds to a database event. Accordingly, one embodiment provides at least three predefined durations as follows: session duration, a transaction duration, and a call duration. When any of these predefined durations "terminate," the memory pool associated with the duration is deallocated, thereby releasing memory for all the complex objects allotted therefrom.

The lifetime of a session duration is that of a database connection/session. A session involves a series of database events such as querying database tables. A database session commences when a user running a database application connects to a database server, which can be located on the same computer system as the database application or on another computer system in a distributed database system. The session duration terminates when the connection to the server is terminated either by the user or the server.

The lifetime of a transaction duration is that of a transaction. A transaction is a sequence of database commands, e.g. Structured Query Language (SQL) statements, that the database server treats as a single unit. Transactions are typically application-defined and commence in response to a user's first executable SQL statement. The transaction duration terminates when the transaction is completed (as by a SQL "COMMIT" command) or aborted (as by a SQL "ROLLBACK" command).

The lifetime of a call duration is based on server-side events from the time a client call is sent to the server until the processing the call completes. A call is an invocation of an operation in a database server. For example, one call requests a database server to parse a SQL command and produce a "cursor" which is a complex object describing the SQL command and containing storage for command parameters. Another example of a call is a request to the database server to execute the parsed SQL statement based on the cursor.

Since the beginning and the end of each the predefined durations corresponds with a database event, the calls to set up and tear down the memory pools can be located in system code, thereby alleviating the burden of coding memory management calls from application software. This system memory management code is thoroughly tested and debugged before release to the application developers. Consequently, predefined durations, whose corresponding memory pools are automatically allocated and deallocated in response to database events, helps to reduce the occurrence of memory management errors by application programmers when developing database applications.

In one embodiment, the user, such as an application programmer, is allowed to create user-defined durations for very fine control over the lifetime of the duration. Accordingly, functionality to create and terminate a user-defined duration is provided, for example, by system library routines supplied by a vendor. One routine allows the user to create a new duration, allocating a separate memory pool for the duration and returning a duration identifier, even when other durations have already been created. Thus, overlapping durations are allowed. Another routine provides a mechanism for releasing memory allocated for the duration. Unlike above-described pre-defined durations, however, the user has to explicitly release memory the user-defined durations. Such user-defined durations have a well-defined end point for their lifetimes, thereby making memory management for complex object assigned to the user-defined durations more robust.

In another embodiment, multiple levels of nested user-defined durations are allowed. Specifically, the user is allowed to specify for a new duration any current duration as parent duration, e.g. by passing the duration identifier of the parent duration to the "create duration" routine. The parent duration can be any of the pre-defined durations or any of the user-defined durations, and the newly created duration is referred to as the child duration of the specified parent duration. When the parent durations is ended, all of its child durations are implicitly and automatically ended.

Remote Procedure Calls

Another embodiment of the present invention has been found to be particularly advantageous in memory management for complex objects returned from routines in general and from remote procedure calls in particular. A routine is a self-consistent set of computer instructions for performing particular tasks. Routines are also known as procedures, functions, methods, and subroutines. The computer instructions can be low-level machine language instructions or high-level instructions in a programming language such as a C or C++ that are ultimately translated into machine language instructions, for example, by compiling or interpreting. Calling or invoking a routine involves passing arguments to the routines, if necessary, and causing the instructions to be executed. A routine may also return one or more results to the calling routine, and these results can be complex objects.

Figure 4:
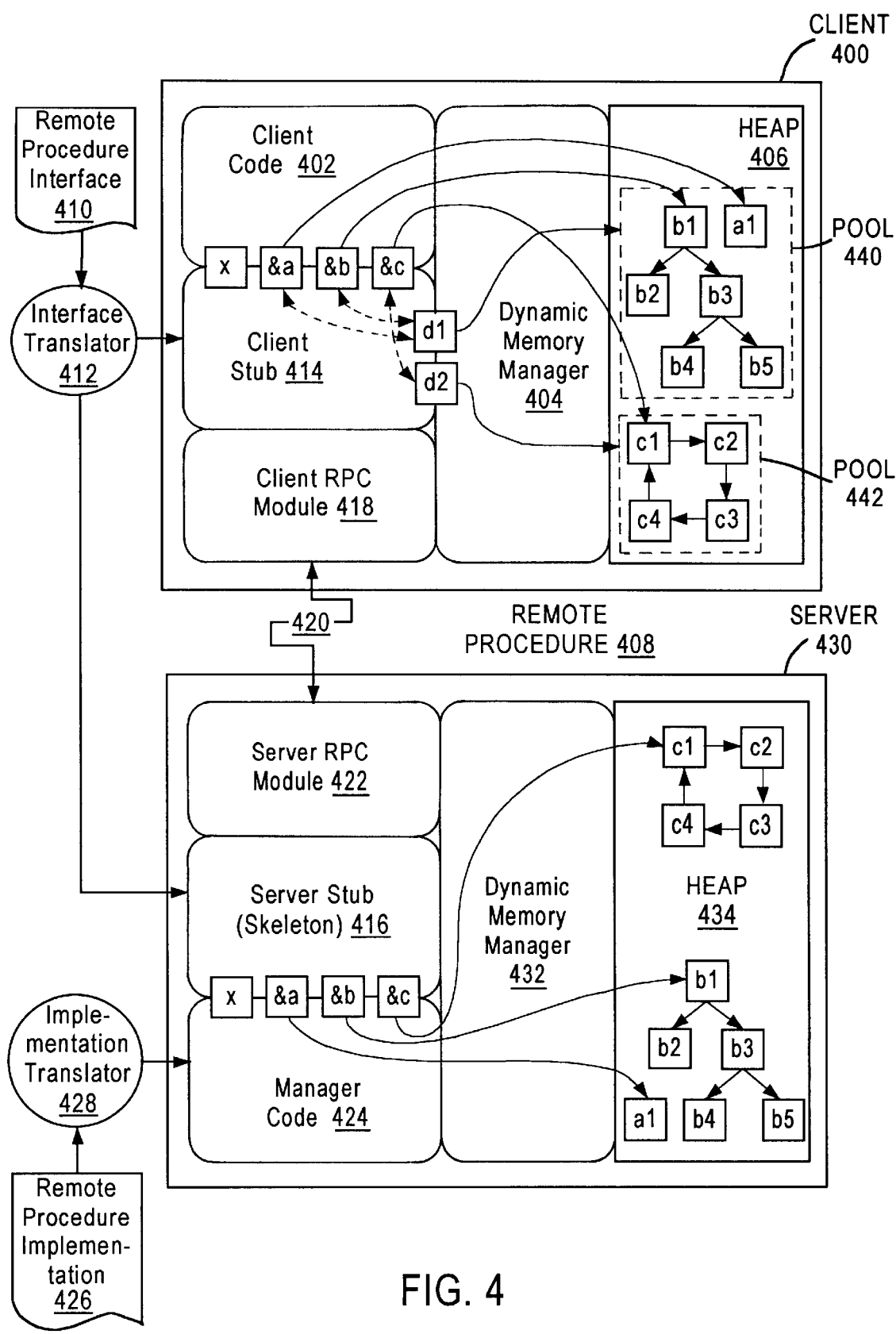
FIG. 4 illustrates an architecture for implementing a remote procedure call that returns a complex object.
Figure 5:
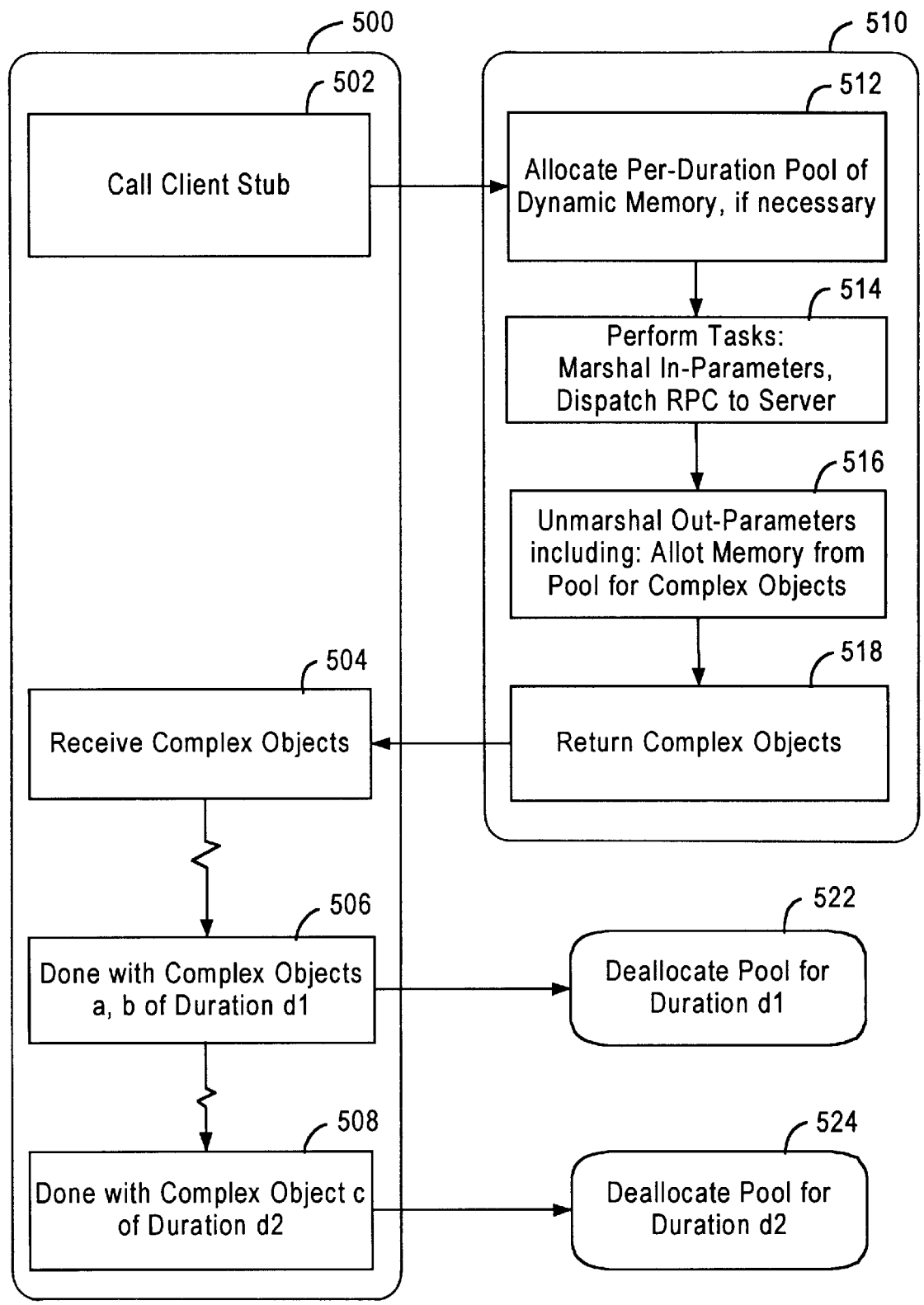
FIG. 5 is a flowchart showing an operation of routines involved in a remote procedure call.
Figure 6:
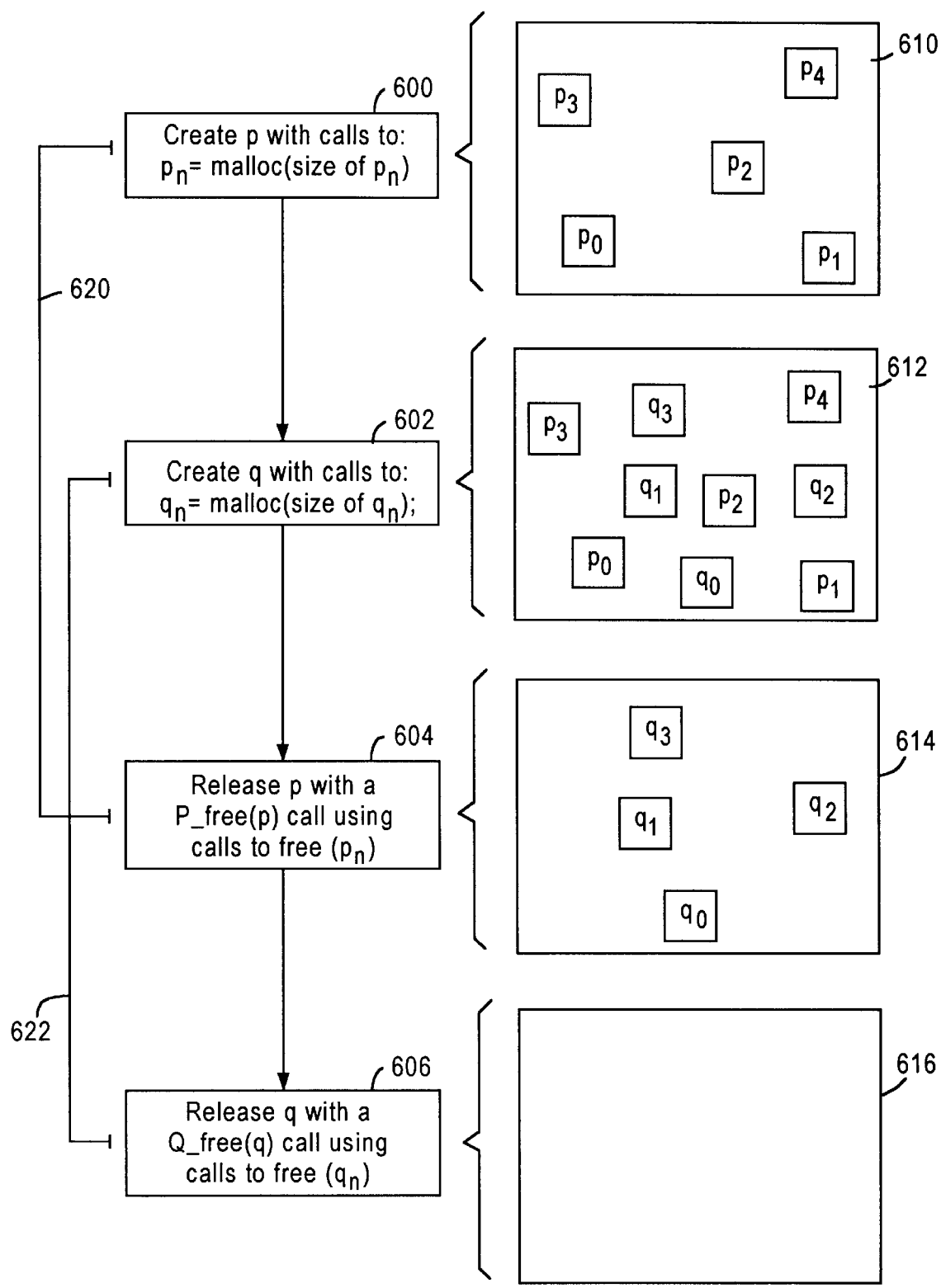
FIG. 6 depicts a sequence of memory allocations and deallocation and a corresponding heap in accordance a "per-object" deallocation approach.
Figure 7:
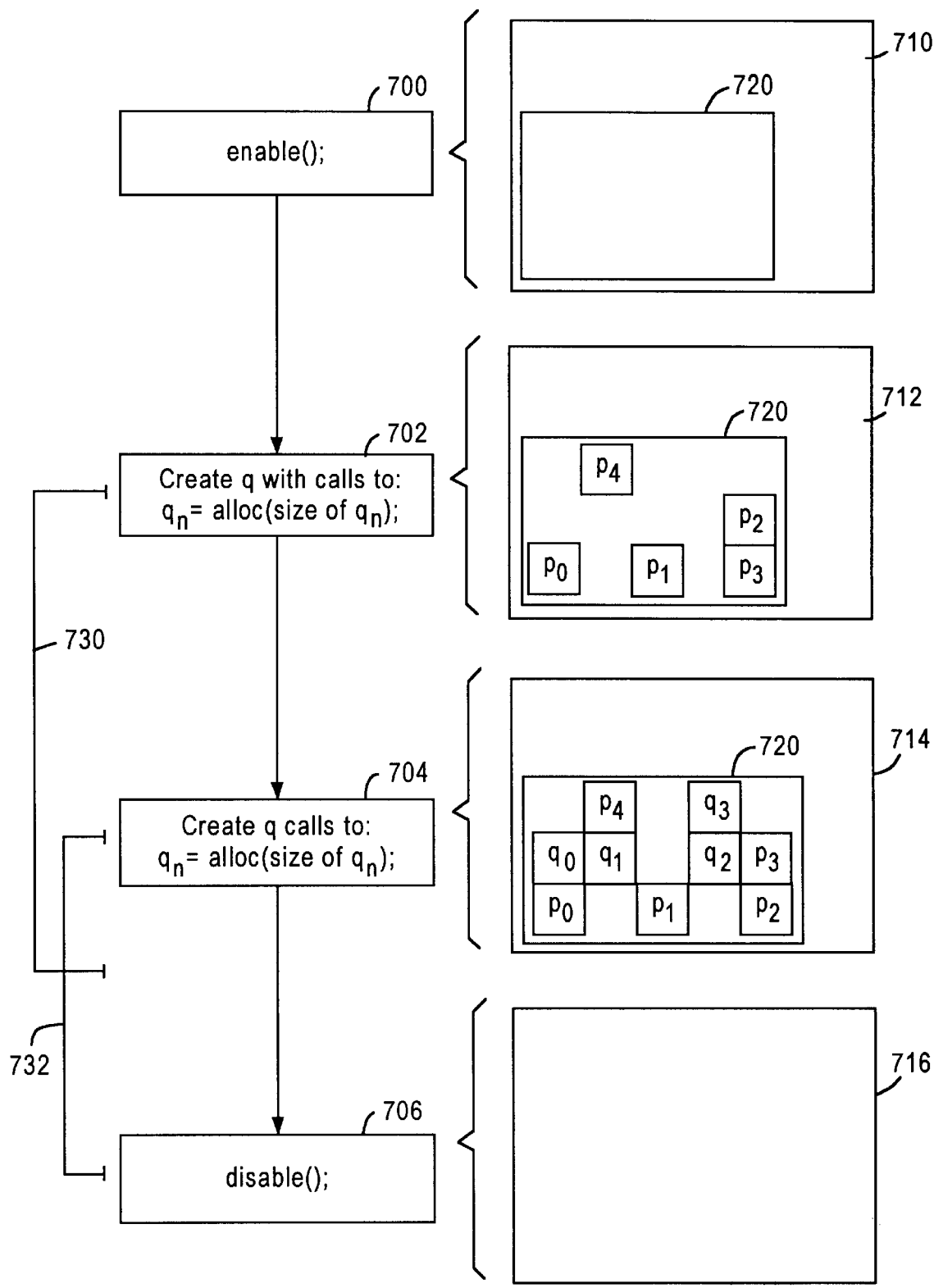
FIG. 7 depicts a sequence of memory allocations and deallocation and a corresponding heap in accordance a "per-client" deallocation approach.

A remote procedure call (RPC) is an invocation initiated by a process on one computer system of a routine to be executed on another computer system. FIG. 4 illustrates an exemplary remote procedure call from a client computer system 400 to a server computer system 430, and FIG. 5 is a flowchart of steps performed on the client 400 according to one embodiment. Client 400 includes client code 402, which uses Dynamic Memory Manager 404, a set of routines provided by the operating system, for allocating and freeing memory in associated heap 406. Client code 402, whose operations are illustrated in block 500, is configured to invoke remote procedure 408, which comprises components located on both client 400 and server 430.

Remote procedure 408 is produced from source files typically coded in one or more high-level computer languages. Typically, such source files include a remote procedure interface file 410, written in an appropriate specification language such as the Interface Description Language (IDL) defined for the Distributed Computing Environment (DCE) by the Open Software Foundation (OSF). The remote procedure interface file 410 includes a declaration of the remote procedure 408 specifying the name, arguments (or "in-parameters"), and results (or "out-parameters" indicated in FIG. 4 by an ampersand "&" prefix) and their types. The remote procedure 408 and type declarations are converted by an appropriate interface translator 412 into two routines: client stub 414 and server stub 416, also known as a skeleton.

Client code 402 therefore invokes remote procedure 408 by calling client stub 414 (step 502). Client stub 414 is a routine on client 400 produced by interface translator 412 and is linked with client code 402 to be callable therefrom. One example of an interface translation 412 includes an IDL compiler as front end to translate the remote procedure interface file 410 into high-level language statement in a programming language such as C, C++, and JAVA and then compile the statements into native machine language instruction or virtual machine bytecodes as appropriate. In accordance with an aspect of the invention, the grammar for IDL is extended to allow user-defined durations to be declared and specified for RPC parameters. For example, the parameter list of an RPC to routine foo could be defined as follows:

```
proc foo (
    [in] type_x x,
    [out, duration(d1)] type_a a,
    [out, duration(d1)] type_b b,
    [out, duration(d2)] type_c c
);
``` where parameters a, b, and c are complex objects. In this example, the complex object out-parameters a and b are assigned to a first user-defined duration d1, complex object out-parameter c is assigned to a second user-defined duration.

Accordingly, an interface translator in accordance with one embodiment is configured to parse the extended IDL description and automatically generate therefrom instructions to perform the steps illustrated in block 510. More specifically, client stub 414 is configured to allocate a per-duration pool 440 of dynamic memory from heap 406 if necessary for each duration specified in the declaration of the RPC (step 512). One way to perform step 512 is to consult the duration identifier for each specified duration in duration table 220. For step 514, client stub 414 is generated to receive and marshal the in-parameters passed by client code 402, for example argument x, for transmission to server 430. Marshaling parameters is the process of converting the parameters into a linear sequence of bytes suitable for transmission to another site in a network. After the in-parameters have been marshaled, the client stub 414 is further configured to invoke services within client RPC module 418 to dispatch the marshaled parameters over a network connection 420 to server RPC module 422 on server 430 for further processing (also step 514). Server RPC 422 receives the information dispatched thereto from client 400, analyzes the information, and, in response, invokes the corresponding server stub 416.

Server stub 416 is a routine on server 430 also produced by interface translator 412 and is linked with manager code 424. Server stub 416 has been generated to unmarshal the transmitted parameters and invoke manager code 424 with the unmarshaled parameters. Manager code 424 is a routine produced from a remote procedure implementation source file 426 by an appropriate implementation source file translator 428, such as a C compiler that converts C sources files into object code. Manager code 424 is coded to implement the functionality of remote procedure 408, which in this example includes allocating by means of dynamic memory manager 432 memory in heap 434 for complex objects a, b, and c and then returning the complex objects as results.

These results, complex objects a, b, and c, are returned to server stub 416, which has been generated by interface translator 412 to marshal the results suitable for transmission back to client 400. Server RPC module 422 transmits the marshaled results across network communication 420 to client RPC module 418, which returns control to client stub 414. Client stub 414 unmarshals the transmitted results, allotting memory for complex objects from associated pools 440 and 442 (step 516). More specifically, the duration identifier for the duration specified for each complex object is looked up in duration lookup table 220 to determine the appropriate memory pool. In the example, complex objects a and b, assigned to duration d1, are allotted memory from corresponding memory pool 440. Complex objects c, on the other hand, is assigned to duration d2, and accordingly is allotted memory from corresponding memory pool 442. These complex objects are passed back as results to client code 402 (steps 518 and 504).

At the end of the lifetime of complex objects a and b (step 506), client code 402 is configured to free the complex objects a and b by a call to an exported routine, provided for deallocating a pool 440 (step 506). In one embodiment, the interface translator 412, upon detecting a declaration of a duration in remote procedure interface 410, emits instructions for a duration-specific deallocation routine. In another embodiment, upon detecting a declaration of a duration in remote procedure interface 410, the interface translator 412 defines a global variable for the duration indicative of the corresponding memory pool. In this embodiment, the global variable is passed to a generic memory pool deallocation routine provided in dynamic memory manager 404 for deallocation. In response, the corresponding memory pool 440 for duration d1 is deallocated, thereby releasing the memory for complex objects a and b (step 522). Likewise, at the end of the lifetime of complex object c (step 508), client code 402 is configured to free the complex object c by a call to an exported routine, provided for deallocating a pool 442 (step 524).

One advantage of duration-based memory management in the context of remote procedure calls is that durations can overlap. Therefore, an application need not traverse the complex object to perform an expensive deep copy operation of a complex object returned from a client stub to make the complex object persist longer than the "per-client" memory management system. In addition, the complex object need not be traversed to free the complex as in the "per-object" approach, also computationally expensive Another advantage of duration-based memory management is that much of the memory allocation operations can be located in the routine that returns the complex objects. Since this routine, client stub 414, is automatically generated by an interface translator 412 based on an interface file 410, the opportunity for human error in coding the memory management instructions is greatly reduced. In fact, this advantage is applicable to extending other programming languages and interface descriptions languages to allow a duration specification for out parameters. For example, C++, JAVA, or PL/SQL, a procedural extension to SQL available from Oracle Corp., can be extended to allow the duration specification for out parameter. The appropriate language translator, e.g. a PL/SQL compiler, parses declarations of PL/SQL procedures and automatically generates therefrom instructions for duration-based memory management.

Duration-Based Resource Management

Some complex objects use resources in addition to dynamically allocated memory. Management of these resources can also be controlled by durations. For example, use of one complex object may involve opening files on disk in addition to allocating memory for a buffer. Typically, opened files need to be closed when no longer. Accordingly, opening and closing files can be controlled by durations. In one implementation, the duration table includes a list of files that had been opened for objects assigned to that duration. When the duration for the object is terminated, the list of files is traversed and each file in the list is closed. Similarly, opening and closing a network connection can be duration-based.

As another example, the resource may be a pin lifetime of the complex object in an object cache. An object cache is a high-speed memory resource for storing frequently accessed objects. After the object cache is full, the least recently used object in the cache is typically swapped out in favor of another object, unless the least recently used object was "pinned" in the cache by the programmer. Accordingly, the lifetime that the object is pinned in an object cache can be controlled by duration. In one implementation the duration table includes a list of pinned objects for that duration. When the duration is terminated, the pinned objects are unpinned, allowing them to be swapped out of the object cache.

Consequently, durations provide a way for programmers to finely control the lifetimes of resources employed within their programs. In these examples, duration-based resource management for resources employed by an object can, but need not, use the same duration that the complex object uses for management of dynamically allocated memory.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of managing resources used by a plurality of complex objects, said method comprising the computer-implemented steps of:

assigning each of said complex objects to any of a plurality of durations;

allocating resources to said complex objects; and releasing the resources for said complex objects by terminating the durations assigned to the complex objects;

wherein the lifetime of one of said complex objects assigned to one of said durations overlaps the lifetime of another of said complex objects assigned to another of said durations.

2. The method of claim 1, wherein:

the step of allocating resources to said complex objects includes the step of opening a file for a complex object; and the step of releasing the resources for said complex objects includes the step of closing the file for the complex object.

3. The method of claim 1, wherein:

the step of allocating resources to said complex objects includes the step of opening a network connection for a complex object; and the step of releasing the resources for said complex objects includes the step of closing the network connect for the complex object.

4. The method of claim 1, wherein:

the step of allocating resources to said complex objects includes the step of pinning a complex object in an object cache; and the step of releasing the resources for said complex objects includes the step of unpinning the complex object in the object cache.

5. The method of claim 1, wherein:

the step of assigning each of said complex objects to any of a plurality of durations includes the step of assigning a complex object to a duration that is a child duration of a parent duration; and the step of releasing the resources for said complex objects by terminating the durations assigned to the complex objects includes the step of releasing the resources for the complex object by:
terminating the parent duration, and
in response to terminating the parent duration, automatically terminating the child duration.

6. A method of managing memory for a plurality of dynamically allocated complex objects, said method comprising the computer-implemented steps of:

allocating a plurality of pools of dynamic memory, each pool of said plurality of pools corresponding to one of a plurality of durations;

allotting memory for said complex objects, wherein each complex object is allotted memory within a pool that corresponds to a duration assigned to said complex object; and releasing memory for said complex objects by deallocating the pools within which the complex objects were allocated;

wherein the lifetime of one of said complex objects assigned to one of said durations overlaps the lifetime of another of said complex objects assigned to another of said durations.

7. The method of claim 6, further comprising the step of providing a predefined duration as one of said durations.

8. The method of claim 7, wherein the step of releasing memory for said complex objects by deallocating the pools within which the complex objects were allocated includes the step of automatically deallocating the pool corresponding to said predefined duration in response to a database event.

9. The method of claim 8, wherein the step of providing a predefined duration as one of said durations includes the step of providing a session duration.

10. The method of claim 8, wherein the step of providing a predefined duration as one of said durations includes the step of providing a transaction duration.

11. The method of claim 8, wherein the step of providing a predefined duration as one of said durations includes the step of providing a call duration.

12. The method of claim 6, further including the step of maintaining said pools of dynamic memory as respective pluralities of chunks of dynamic memory, said chunks including at least a prescribed number of bytes.

13. The method of claim 12, wherein the step of allotting memory for said complex objects from corresponding pools of said pools includes the steps of:

receiving a request to allot a number of bytes of memory for at least a portion of said one of said complex objects;

determining whether one of said chunks has enough space to store said number of bytes;

if one of said chunks has enough said space, then allocating said memory from said enough space; and if none of said chunks has enough said space, then allocating a new chunk of dynamic memory at least as large as said number of bytes and allocating said memory from said new chunk of memory.

14. The method of claim 6, further comprising the step of executing a routine, which step includes the steps of:

allotting memory for one of said complex objects, wherein the complex object is allotted memory within the pool that corresponds to the duration assigned to the one of said complex objects; and returning said one of said complex objects after allotting the memory for said one of said complex objects.

15. The method of claim 14, wherein the step of executing a routine includes the step of executing a client stub routine.

16. A method of translating a description of an interface for a procedure call, said method comprising the computer-implemented steps of:

parsing said description of an interface to determine a duration assigned for a complex object out-parameter;

automatically generating a routine for said procedure call based on said description, said routine including instructions for:
allotting memory for said complex object out-parameter within a pool of allocated dynamic memory associated with said duration assigned to said complex object out-parameter, and
returning said complex object; and providing a memory deallocation routine including instructions for deallocating said pool.

17. The method of claim 16, wherein automatically generating a routine for said procedure call based on said description includes the step of automatically generating a client stub routine for a remote procedure call based on said description.

18. The method of claim 17, wherein the step of allotting memory for said complex object out-parameter within a pool of allocated dynamic memory associated with said duration assigned said complex object includes the steps of:

receiving a request to allot a number of bytes of memory for at least a portion of said complex objects;

determining whether one of said chunks has enough space to store said number of bytes;

if one of said chunks has enough said space, then allocating said memory from said enough space; and if none of said chunks has enough said space, then allocating a new chunk of dynamic memory at least as large as said number of bytes and allocating said memory from said new chunk of memory.

19. A computer-readable medium bearing instruction for managing resources used by a plurality of complex objects, said instructions arranged, when executed, to cause one or processors to perform the steps of:

assigning each of said complex objects to any of a plurality of durations;

allocating resources to said complex objects; and releasing the resources for said complex objects by terminating the duration assigned to the complex objects;

wherein the lifetime of one of said complex objects assigned to one of said durations overlaps the lifetime of another of said complex objects assigned to another of said durations.

20. The computer-readable medium of claim 19, wherein:

the step of allocating resources to said complex objects includes the step of opening a file for a complex object; and the step of releasing the resources for said complex objects includes the step of closing the file for the complex object.

21. The computer-readable medium of claim 19, wherein:
the step of allocating resources to said complex objects includes the step of opening a network connection for a complex object; and
the step of releasing the resources for said complex objects includes the step of closing the network connect for the complex object.

22. The computer-readable medium of claim 19, wherein:
the step of allocating resources to said complex objects includes the step of pinning a complex object in an object cache; and
the step of releasing the resources for said complex objects includes the step of unpinning the complex object in the object cache.

23. The computer-readable medium of claim 19, wherein:
the step of assigning each of said complex objects to any of a plurality of durations includes the step of assigning a complex object to a duration that is a child duration of a parent duration; and
the step of releasing the resources for said complex objects by terminating the durations assigned to the complex objects includes the step of releasing the resources for the complex object by:
terminating the parent duration, and
in response to terminating the parent duration, automatically terminating the child duration.

24. A computer-readable medium bearing instructions for managing memory for a plurality of dynamically allocated complex objects, said complex objects assigned to a plurality of durations, said instructions arranged, when executed, to cause one or more processors to perform the steps of:
allocating a plurality of pools of dynamic memory, each pool of said plurality of pools corresponding to one of said durations;
allotting memory for said complex objects, wherein each complex object is allotted memory within a pool that corresponds to a duration assigned to said each complex object; and
releasing memory for said complex objects by deallocating the pools within which the complex objects were allocated;
wherein the lifetime of one of said complex objects assigned to one of said durations overlaps the lifetime of another of said complex objects assigned to another of said durations.

25. The computer-readable medium of claim 24, wherein said instruction are further arranged for performing the step of providing a predefined duration as one of said durations.

26. The computer-readable medium of claim 25, wherein the step of releasing memory for said complex objects by deallocating the pools within which the complex objects were allocated includes the step of automatically deallocating the pool corresponding to said predefined duration in response to a database event.

27. The computer-readable medium of claim 26, wherein the step of providing a predefined duration as one of said durations includes the step of providing a session duration.

28. The computer-readable medium of claim 26, wherein the step of providing a predefined duration as one of said durations includes the step of providing a transaction duration.

29. The computer-readable medium of claim 26, wherein the step of providing a predefined duration as one of said durations includes the step of providing a call duration.

30. The computer-readable medium of claim 24, wherein said instructions are further arranged for performing the step of maintaining said pools of dynamic memory as respective pluralities of chunks of dynamic memory, said chunks including at least a prescribed number of bytes.

31. The computer-readable medium of claim 30, wherein the step of allotting memory for said complex objects from corresponding pools of said pools includes the steps of:
receiving a request to allot a number of bytes of memory for at least a portion of said one of said complex objects;
determining whether one of said chunks has enough space to store said number of bytes;
if one of said chunks has enough said space, then allocating said memory from said enough space; and
if none of said chunks has enough said space, then allocating a new chunk of dynamic memory at least as large as said number of bytes and allocating said memory from said new chunk of memory.

32. The computer-readable medium of claim 24, wherein said instructions are further arranged for performing the steps of executing a routine, which step includes the steps of:
allotting memory for one of said complex objects, wherein the complex object is allotted memory within the pool that corresponds to the duration assigned to the one of said complex objects; and
returning said one of said complex objects after allotting the memory for said one of said complex objects.

33. The computer-readable medium of claim 32, wherein the step of executing a routine includes the step of executing a client stub routine.

34. A computer-readable medium bearing instructions for translating a description of an interface for a procedure call, said instructions arranged, when executed, for causing one or more processors to perform the steps of:
parsing said description of an interface to determine a duration assigned for a complex object out-parameter;
automatically generating a routine for said procedure call based on said description, said routine including instructions for:
allotting memory for said complex object out-parameter within a pool of allocated dynamic memory associated with said duration assigned to said complex object out-parameter, and
returning said complex object; and
providing a memory deallocation routine including instructions for deallocating said pool.

35. The computer-readable medium of claim 34, wherein automatically generating a routine for said procedure call based on said description includes the step of automatically generating a client stub routine for a remote procedure call based on said description.

36. The computer-readable medium of claim 34, wherein the step of allotting memory for said complex object out-parameter within a pool of allocated dynamic memory associated with said duration assigned said complex object includes the steps of:
receiving a request to allot a number of bytes of memory for at least a portion of said complex objects;
determining whether one of said chunks has enough space to store said number of bytes;
if one of said chunks has enough said space, then allocating said memory from said enough space; and
if none of said chunks has enough said space, then allocating a new chunk of dynamic memory at least as large as said number of bytes and allocating said memory from said new chunk of memory.

* * * * *